US012793603B2

(12) United States Patent
Jang et al.

(10) Patent No.: US 12,793,603 B2
(45) Date of Patent: Nov. 10, 2026

(54) DISPLAY APPARATUS AND METHOD OF DRIVING DISPLAY PANEL USING THE SAME

(71) Applicant: Samsung Display Co., LTD., Yongin-si (KR)

(72) Inventors: Dae-Gwang Jang, Yongin-si (KR); Kuk-Hwan Ahn, Yongin-si (KR); Seungjae Lee, Yongin-si (KR); Seongheon Cho, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/959,484

(22) Filed: Nov. 25, 2024

(65) Prior Publication Data

US 2025/0225908 A1 Jul. 10, 2025

(30) Foreign Application Priority Data

Jan. 4, 2024 (KR) ........................ 10-2024-0001606

(51) Int. Cl.
*G09G 3/20* (2006.01)

(52) U.S. Cl.
CPC ......... *G09G 3/2092* (2013.01); *G09G 3/2007* (2013.01); *G09G 2320/048* (2013.01); *G09G 2330/021* (2013.01); *G09G 2330/028* (2013.01)

(58) Field of Classification Search
CPC ............... G09G 3/2092; G09G 3/2007; G09G 2320/048; G09G 2330/021; G09G 2330/028; G09G 3/20; G09G 3/32; G09G 3/3225; G09G 3/36; G09G 2320/041; G09G 2330/045; G09G 3/3688; G09G 3/3275; G09G 2310/027; G09G 2320/0271
See application file for complete search history.

(56) References Cited

U.S. PATENT DOCUMENTS

| | | | | |
|---|---|---|---|---|
| 10,197,838 B2 * | 2/2019 | Nam | ..................... | G02F 1/1368 |
| 11,270,653 B2 * | 3/2022 | Kim | ..................... | G09G 3/3275 |
| 11,887,552 B1 * | 1/2024 | Wen | ..................... | G09G 3/3607 |
| 2010/0026725 A1 * | 2/2010 | Smith | .................. | G09G 3/3216 345/204 |

(Continued)

FOREIGN PATENT DOCUMENTS

| | | |
|---|---|---|
| KR | 1020170003251 A | 1/2017 |
| KR | 1020170072407 A | 6/2017 |

(Continued)

*Primary Examiner* — Jose R Soto Lopez
(74) *Attorney, Agent, or Firm* — CANTOR COLBURN LLP

(57) ABSTRACT

A display apparatus includes a display panel, a data driver and a driving controller. The data driver is configured to output a data voltage to the display panel. The driving controller is configured to control the data driver. The driving controller is configured to generate a temperature prediction value according to a location in the display panel based on a grayscale value of input image data, a grayscale data voltage corresponding to the grayscale value, a grayscale data current corresponding to the grayscale value, a temperature efficiency which is varied according to a usage time of the display panel, a high power voltage setting value of the display panel and a low power voltage setting value of the display panel.

17 Claims, 10 Drawing Sheets

(56) References Cited

U.S. PATENT DOCUMENTS

| | | | | |
|---|---|---|---|---|
| 2014/0118426 | A1* | 5/2014 | Chun | G09G 3/20 345/691 |
| 2015/0042630 | A1* | 2/2015 | Lee | G09G 3/3233 345/77 |
| 2016/0155382 | A1* | 6/2016 | Cheon | G09G 3/3258 345/76 |
| 2017/0206834 | A1* | 7/2017 | Lee | G09G 3/3258 |
| 2017/0236490 | A1* | 8/2017 | Cheon | G09G 5/10 345/691 |
| 2018/0082631 | A1* | 3/2018 | Chang | G09G 3/3648 |
| 2019/0180695 | A1* | 6/2019 | Ha | G09G 3/2051 |
| 2021/0366343 | A1* | 11/2021 | Oh | G09G 3/2003 |
| 2022/0068204 | A1* | 3/2022 | Iwauchi | G09G 3/3233 |
| 2022/0068220 | A1* | 3/2022 | Kim | G09G 3/3266 |
| 2022/0108650 | A1* | 4/2022 | Park | G09G 3/32 |
| 2022/0165220 | A1* | 5/2022 | Kim | G09G 5/10 |
| 2022/0223092 | A1* | 7/2022 | Lee | G09G 3/2007 |
| 2022/0262307 | A1* | 8/2022 | Pyun | G09G 3/006 |
| 2022/0293021 | A1* | 9/2022 | Hong | G09G 3/3225 |
| 2022/0309999 | A1* | 9/2022 | Kubo | G09G 3/32 |
| 2022/0392382 | A1* | 12/2022 | Park | G09G 3/20 |
| 2022/0406235 | A1* | 12/2022 | Pyun | G09G 3/2088 |
| 2023/0386385 | A1* | 11/2023 | Pyun | G09G 3/2007 |
| 2024/0021115 | A1* | 1/2024 | Yamada | G01K 3/06 |
| 2024/0144877 | A1 | 5/2024 | Jang | |
| 2024/0212576 | A1* | 6/2024 | Lee | G09G 3/2007 |
| 2024/0257690 | A1* | 8/2024 | Huang | G09G 3/2007 |

FOREIGN PATENT DOCUMENTS

| | | | |
|---|---|---|---|
| KR | 1020200019299 | A | 2/2020 |
| KR | 1020220168638 | A | 12/2022 |

* cited by examiner

DISPLAY APPARATUS AND METHOD OF DRIVING DISPLAY PANEL USING THE SAME

This application claims priority to Korean Patent Application No. 10-2024-0001606, filed on Jan. 4, 2024, and all the benefits accruing therefrom under 35 U.S.C. § 119, the content of which in its entirety is herein incorporated by reference.

BACKGROUND

1. Field

Embodiments of the present invention relate to a display apparatus and a method of driving a display panel using the display apparatus. More particularly, embodiments of the present invention relate to a display apparatus for determining a temperature prediction value using a temperature efficiency varied according to a usage time of a display panel and a method of driving the display panel using the display apparatus.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls an operation of the gate driver and an operation of the data driver.

The driving controller may predict a temperature according to a location in the display panel to enhance a display quality of the display panel and to enhance a reliability and a stability of the display apparatus. When initial values of parameters for a temperature prediction are used, an accuracy of a temperature prediction value may decrease as a usage time of the display panel increases.

SUMMARY

Embodiments of the present invention provide a display apparatus for determining a temperature prediction value using a temperature efficiency varied according to a usage time of a display panel to enhance an accuracy of the temperature prediction value.

Embodiments of the present invention also provide a method of driving a display panel using the display apparatus.

In an embodiment of a display apparatus according to the present invention, the display apparatus includes a display panel, a data driver and a driving controller. The data driver is configured to output a data voltage to the display panel. The driving controller is configured to control the data driver. The driving controller is configured to generate a temperature prediction value according to a location in the display panel based on a grayscale value of input image data, a grayscale data voltage corresponding to the grayscale value, a grayscale data current corresponding to the grayscale value, a temperature efficiency which is varied according to a usage time of the display panel, a high power voltage setting value of the display panel and a low power voltage setting value of the display panel.

In an embodiment, the grayscale data voltage may be varied according to a luminance setting value set by a user.

In an embodiment, the grayscale data voltage may be varied according to a driving frequency of the display panel.

In an embodiment, the grayscale data voltage may be varied according to a color of a pixel of the display panel.

In an embodiment, the grayscale data current may be varied according to the grayscale data voltage and the color of the pixel of the display panel.

In an embodiment, the temperature efficiency may mean a temperature for an input power. The temperature efficiency may be represented as a ratio of a present temperature change for an input power at a present time point to an initial temperature change for the input power at an initial time point.

In an embodiment, the high power voltage setting value and the low power voltage setting value may be varied according to the usage time of the display panel.

In an embodiment, the driving controller may include a temperature predictor configured to generate an initial temperature prediction value based on the grayscale value, the grayscale data voltage, the grayscale data current, the high power voltage setting value and the low power voltage setting value and a temperature adjuster configured to generate the temperature prediction value by adjusting the initial temperature prediction value using the temperature efficiency which is varied according to the usage time of the display panel.

In an embodiment, the temperature efficiency may be represented as a ratio of a present temperature change for an input power at a present time point to an initial temperature change for the input power at an initial time point. The temperature adjuster may be configured to multiply the initial temperature prediction value by the ratio.

In an embodiment, the driving controller may be configured to generate the temperature prediction value based on the grayscale value, the grayscale data voltage, the grayscale data current, the temperature efficiency which is varied according to the usage time of the display panel, the high power voltage setting value, the low power voltage setting value and a data power voltage setting value of the data driver. The high power voltage setting value, the low power voltage setting value and the data power voltage setting value may be varied according to the usage time of the display panel.

In an embodiment, the driving controller may include an efficiency calculator configured to calculate the temperature efficiency based on the usage time, a power voltage determiner configured to determine the high power voltage setting value, the low power voltage setting value and the data power voltage setting value based on the usage time, a temperature predictor configured to generate an initial temperature prediction value based on the grayscale value, the grayscale data voltage, the grayscale data current, the high power voltage setting value, the low power voltage setting value and the data power voltage setting value and a temperature adjuster configured to generate the temperature prediction value by adjusting the initial temperature prediction value using the temperature efficiency varied according to the usage time of the display panel. The display apparatus may further include a power voltage generator configured to generate a high power voltage of the display panel, a low power voltage of the display panel and a data power voltage of the data driver which are varied according to the usage time based on the high power voltage setting value, the low power voltage setting value and the data power voltage setting value.

In an embodiment, the driving controller may include an efficiency calculator configured to calculate the temperature efficiency based on the usage time, a power voltage determiner configured to determine the high power voltage setting value and the low power voltage setting value based on the usage time, a temperature predictor configured to generate an initial temperature prediction value based on the grayscale value, the grayscale data voltage, the grayscale data current, the high power voltage setting value and the low power voltage setting value and a temperature adjuster configured to generate the temperature prediction value by adjusting the initial temperature prediction value using the temperature efficiency varied according to the usage time of the display panel. The display apparatus may further include a power voltage generator configured to generate a high power voltage of the display panel and a low power voltage of the display panel which are varied according to the usage time based on the high power voltage setting value and the low power voltage setting value. The power voltage generator may be configured to generate a data power voltage of the data driver fixed regardless of the usage time.

In an embodiment, the driving controller may include an efficiency calculator configured to calculate the temperature efficiency based on the usage time, a temperature predictor configured to generate an initial temperature prediction value based on the grayscale value, the grayscale data voltage, the grayscale data current, the high power voltage setting value and the low power voltage setting value and a temperature adjuster configured to generate the temperature prediction value by adjusting the initial temperature prediction value using the temperature efficiency varied according to the usage time of the display panel.

In an embodiment, the driving controller may include an efficiency calculator configured to calculate the temperature efficiency based on the usage time, a high power voltage efficiency based on the usage time, a low power voltage efficiency based on the usage time and a data power voltage efficiency based on the usage time, a power voltage determiner configured to determine the high power voltage setting value based on the high power voltage efficiency, the low power voltage setting value based on the low power voltage efficiency and the data power voltage setting value of the data driver based on the data power voltage efficiency, a temperature predictor configured to generate an initial temperature prediction value based on the grayscale value, the grayscale data voltage, the grayscale data current, the high power voltage setting value, the low power voltage setting value and the data power voltage setting value and a temperature adjuster configured to generate the temperature prediction value by adjusting the initial temperature prediction value using the temperature efficiency varied according to the usage time of the display panel. The display apparatus may further include a power voltage generator configured to generate a high power voltage of the display panel varied according to the usage time, a low power voltage of the display panel varied according to the usage time and a data power voltage of the data driver varied according to the usage time based on the high power voltage setting value, the low power voltage setting value and the data power voltage setting value.

In an embodiment, the driving controller may include a usage time calculator configured to calculate the usage time of the display panel, an efficiency calculator configured to calculate the temperature efficiency based on the usage time, a power voltage determiner configured to determine the high power voltage setting value, the low power voltage setting value and a data power voltage setting value of the data driver based on the usage time, a temperature predictor configured to generate an initial temperature prediction value based on the grayscale value, the grayscale data voltage, the grayscale data current, the high power voltage setting value, the low power voltage setting value and the data power voltage setting value and a temperature adjuster configured to generate the temperature prediction value by adjusting the initial temperature prediction value using the temperature efficiency varied according to the usage time of the display panel. The display apparatus may further include a power voltage generator configured to generate a high power voltage of the display panel varied according to the usage time, a low power voltage of the display panel varied according to the usage time and a data power voltage of the data driver varied according to the usage time based on the high power voltage setting value, the low power voltage setting value and the data power voltage setting value.

In an embodiment, the driving controller may include an efficiency calculator configured to calculate the temperature efficiency based on the usage time, a power voltage determiner configured to determine the high power voltage setting value, the low power voltage setting value and a data power voltage setting value based on the usage time and a temperature predictor configured to generate the temperature prediction value based on the grayscale value, the grayscale data voltage, the grayscale data current, the temperature efficiency which is varied according to the usage time of the display panel, the high power voltage setting value, the low power voltage setting value and the data power voltage setting value. The display apparatus may further include a power voltage generator configured to generate a high power voltage of the display panel varied according to the usage time, a low power voltage of the display panel varied according to the usage time and a data power voltage of the data driver varied according to the usage time based on the high power voltage setting value, the low power voltage setting value and the data power voltage setting value.

In an embodiment of a method of driving a display panel according to the present invention, the method includes generating a temperature prediction value according to a location in the display panel based on a grayscale value of input image data, a grayscale data voltage corresponding to the grayscale value, a grayscale data current corresponding to the grayscale value, a temperature efficiency which is varied according to a usage time of the display panel, a high power voltage setting value of the display panel and a low power voltage setting value of the display panel, generating a data voltage for the grayscale value based on the input image data and the temperature prediction value and displaying an image on the display panel based on the data voltage for the grayscale value.

In an embodiment, the grayscale data voltage may be varied according to at least one of a luminance setting value set by a user, a driving frequency of the display panel and a color of a pixel of the display panel. The grayscale data current may be varied according to the grayscale data voltage and the color of the pixel of the display panel.

In an embodiment, the generating of the temperature prediction value may include generating an initial temperature prediction value based on the grayscale value, the grayscale data voltage, the grayscale data current, the high power voltage setting value and the low power voltage setting value and generating the temperature prediction value by adjusting the initial temperature prediction value using the temperature efficiency which is varied according to the usage time of the display panel.

In an embodiment, the generating of the temperature prediction value may include generating the temperature prediction value based on the grayscale value, the grayscale data voltage, the grayscale data current, the temperature efficiency which is varied according to the usage time of the display panel, the high power voltage setting value, the low power voltage setting value and a data power voltage setting value of the data driver. The high power voltage setting value, the low power voltage setting value and the data power voltage setting value may be varied according to the usage time of the display panel.

According to the display apparatus and the method of driving the display panel, the temperature prediction value may be determined using the temperature efficiency varied according to the usage time of the display panel to enhance the accuracy of the temperature prediction value.

The accuracy of the temperature prediction value may be enhanced so that the display quality of the display panel may be enhanced and the reliability and the stability of the display apparatus may be enhanced.

BRIEF DESCRIPTION OF THE DRAWINGS

The above and other features and advantages of the present invention will become more apparent by describing in detailed embodiments thereof with reference to the accompanying drawings, in which.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
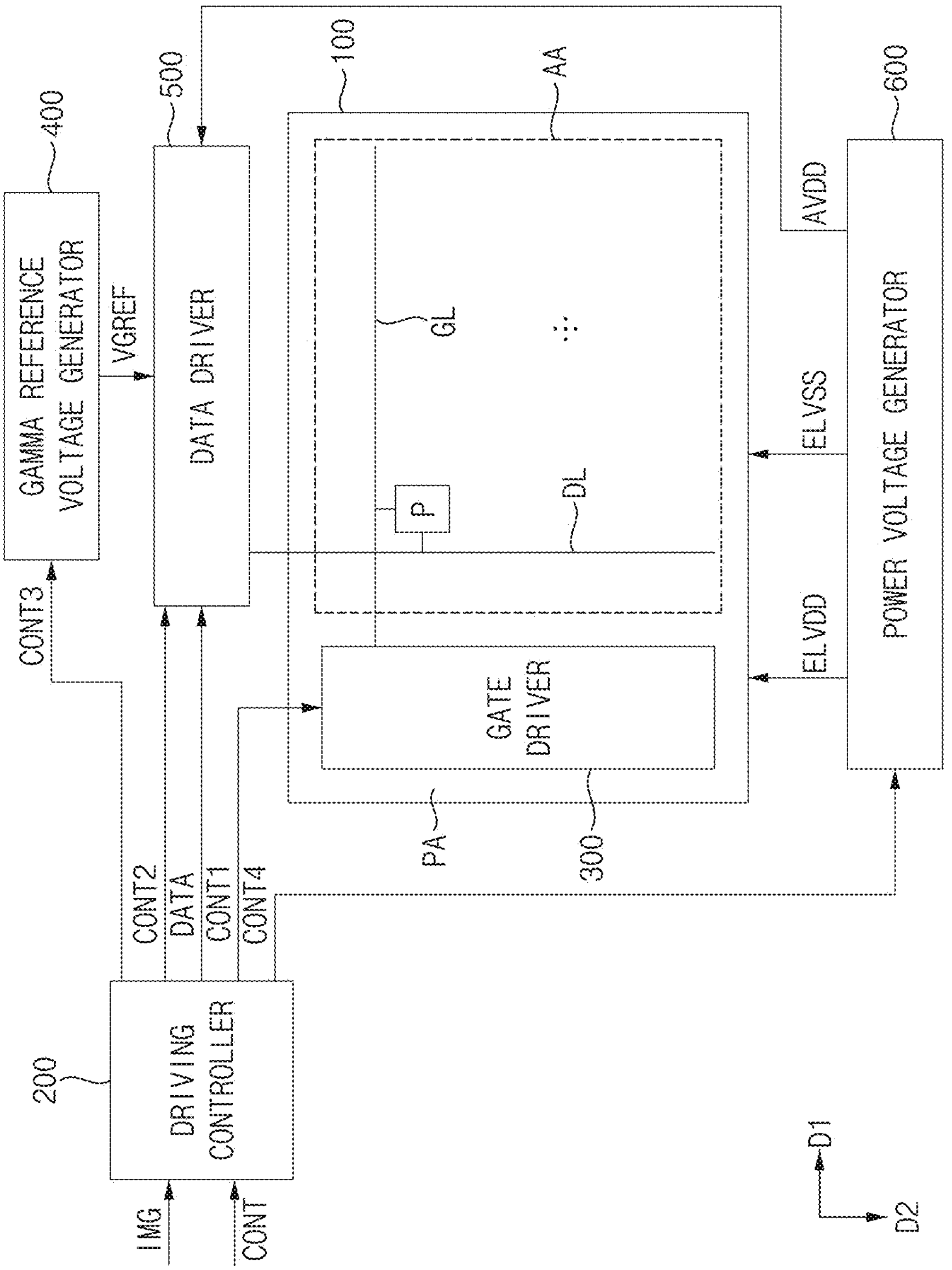
FIG. 1 is a block diagram illustrating a display apparatus according to an embodiment of the present invention.

FIG. 1 is a block diagram illustrating a display apparatus according to an embodiment of the present invention.

Referring to FIG. 1, the display apparatus includes a display panel 100 and a display panel driver. The display panel driver drives the display panel 100. The display panel driver includes a driving controller 200, a gate driver 300, a gamma reference voltage generator 400, a data driver 500 and a power voltage generator 600.

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be called to a timing controller embedded data driver (TED).

The display panel 100 has a display region AA on which an image is displayed and a peripheral region PA adjacent to the display region AA.

The display panel 100 includes a plurality of gate lines GL, a plurality of data lines DL and a plurality of pixels P connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus (e.g., an application processor). For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

Figure 7:
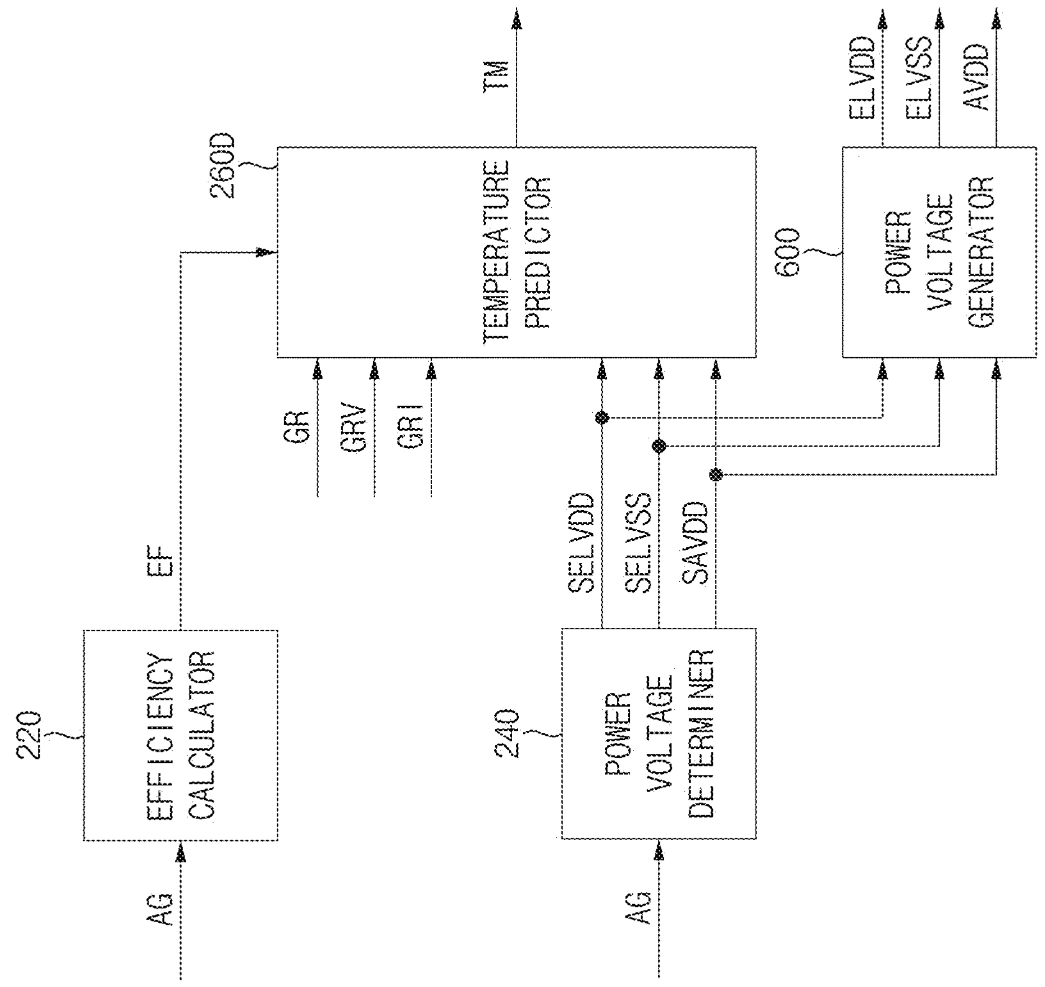
FIG. 7 is a block diagram illustrating a driving controller and a power voltage generator of a display apparatus according to still another embodiment of the present invention.

The driving controller 200 generates the data signal DATA based on the input image data IMG and a temperature prediction value TM (See FIG. 7). The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the power voltage generator 600 based on the input control signal CONT, and outputs the fourth control signal CONT4 to the power voltage generator 600.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the peripheral region PA of the display panel 100. For example, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate a high power voltage ELVDD of the display panel 100, a low power voltage ELVSS of the display panel 100 and a data power voltage AVDD of the data driver 500 in response to the fourth control signal CONT4 received from the driving controller 200. The power voltage generator 600 may output the high power voltage ELVDD of the display panel 100 and the low power voltage ELVSS of the display panel 100 to the display panel 100. The power voltage generator 600 may output the data power voltage AVDD to the data driver 500.

Figure 2:
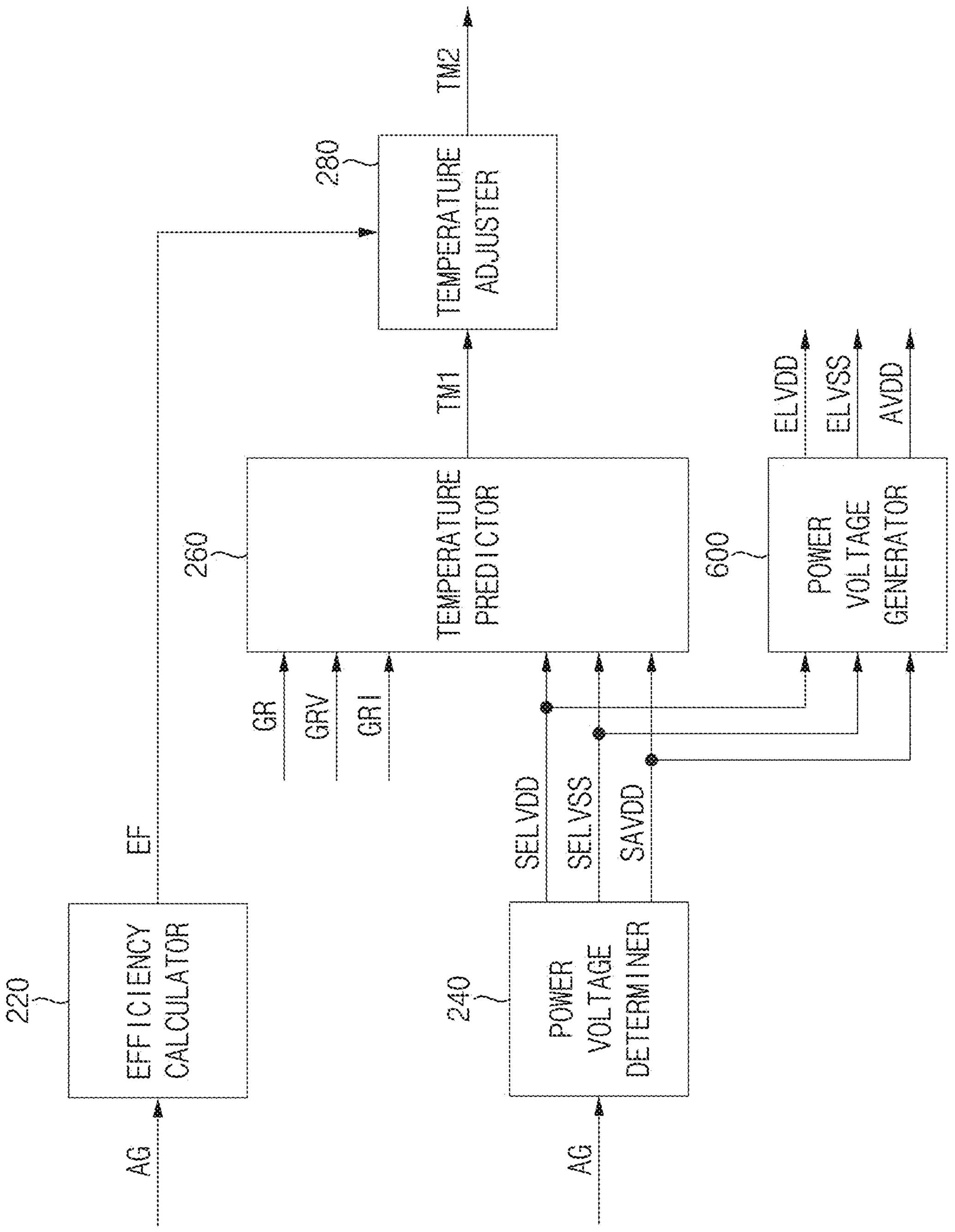
FIG. 2 is a block diagram illustrating a driving controller and a power voltage generator of FIG. 1.

FIG. 2 is a block diagram illustrating the driving controller 200 and the power voltage generator 600 of FIG. 1.

Referring to FIGS. 1 and 2, the driving controller 200 generates a temperature predication value TM2 according to a location in the display panel 100 based on a grayscale value GR of the input image data IMG, a grayscale data voltage GRV corresponding to the grayscale value GR, a grayscale data current GRI corresponding to the grayscale value GR, a temperature efficiency EF varied according to a usage time AG of the display panel 100, a high power voltage setting value SELVDD of the display panel 100 and a low power voltage setting value SELVSS of the display panel 100.

Herein, the grayscale data voltage GRV may mean a data voltage setting value for the data driver 500 to output a corresponding data voltage to the display panel 100. For example, when the data driver 500 outputs a voltage of 3 voltages (V) to the display panel 100 corresponding to a grayscale value of 255 of a red pixel, the grayscale data voltage GRV may not be 3V itself, but may be a setting value representing 3V. For example, when the data driver 500 outputs a voltage of 4V to the display panel 100 corresponding to a grayscale value of 255 of a green pixel, the grayscale data voltage GRV may not be 4V itself, but may be a setting value representing 4V.

The grayscale data voltage GRV may be varied according to a luminance setting value set by a user. For example, for the same grayscale value GR, the grayscale data voltage GRV in a case of the luminance setting value of 500 nit may be different from the grayscale data voltage GRV in a case of the luminance setting value of 100 nit.

The grayscale data voltage GRV may be varied according to a driving frequency of the display panel 100. For example, for the same grayscale value GR, the grayscale data voltage GRV in a case of the driving frequency of 120 Hertz (Hz) may be different from the grayscale data voltage GRV in a case of the driving frequency of 10 Hz.

The grayscale data voltage GRV may be varied according to a color of a pixel of the display panel 100. For example, for the same grayscale value GR, the grayscale data voltage GRV in a case of the color of the pixel of red may be different from the grayscale data voltage GRV in a case of the color of the pixel of green.

The grayscale data current GRI may be varied according to the grayscale data voltage GRV and the color of the pixel of the display panel 100. For example, for the same grayscale data voltage GRV, the grayscale data current GRI in a case of the color of the pixel of red may be different from the grayscale data current GRI in a case of the color of the pixel of green. On the other hand, when the color of the pixel of the display panel 100 is the same, the gray data voltage GRV and the gray data current GRI may correspond one to one. That is, when the color of the pixel of the display panel 100 is the same, the gray data current GRI may be determined by the gray data voltage GRV.

The grayscale data current GRI may be varied according to the usage time AG. For example, a current change ratio according to the usage time AG may be reflected to the grayscale data current GRI. For example, a current change amount according to the usage time AG may be reflected to the grayscale data current GRI.

The temperature efficiency EF may be related to a temperature change for an input power. For example, in a case in which 1 watt (W) of power is input to the display panel 100 and a temperature of the display panel 100 increases by 2 degrees is considered to be 100% efficiency of the temperature efficiency EF, a case in which 1 W of power is input to the display panel 100 and the temperature of the display panel 100 increases by 2.1 degrees may be referred to as 105% efficiency. For example, in a case in which 1 W of power is input to the display panel 100 and the temperature of the display panel 100 increases by 2 degrees is considered to be 100% efficiency, a case in which 1 W of power is input to the display panel 100 and the temperature of the display panel 100 increases by 1.9 degrees may be referred to as 95% efficiency of the temperature efficiency EF.

The temperature efficiency EF may be represented as a ratio of a present temperature change for the input power at a present time point to an initial temperature change for the input power at an initial time point. Herein, the initial time point may refer to a time point when the usage time AG of the display panel 100 is zero. The present time point may refer to a status having an accumulated usage time AG of the display panel 100 up to now.

When an initial temperature change amount for 1 W of the input power at the initial time point is 2 degrees and a present temperature change amount for 1 W of the input power at the present time point is 2.1 degrees, the temperature efficiency EF may be 105%. When the initial temperature change amount for 1 W of the input power at the initial time point is 2 degrees and the present temperature change amount for 1 W of the input power at the present time point is 1.9 degrees, the temperature efficiency EF may be 95%.

In the present embodiment, the driving controller 200 may include an efficiency calculator 220 for calculating the temperature efficiency EF based on the usage time AG, a power voltage determiner 240 for determining the high power voltage setting value SELVDD, the low power voltage setting value SELVSS and a data power voltage setting value SAVDD based on the usage time AG, a temperature predictor 260 for generating a first temperature prediction value TM1 (referred to as "initial temperature prediction value") based on the grayscale value GR, the grayscale data voltage GRV, the grayscale data current GRI, the high power voltage setting value SELVDD, the low power voltage setting value SELVSS and the data power voltage setting value SAVDD and a temperature adjuster 280 for generating a second temperature prediction value TM2 by adjusting the first temperature prediction value TM1 using the temperature efficiency EF varied according to the usage time AG of the display panel 100. The second temperature prediction value TM2 may correspond to the temperature prediction value TM in FIG. 7.

The power voltage generator 600 may generate the high power voltage ELVDD of the display panel 100 varied according to the usage time AG, the low power voltage ELVSS of the display panel 100 varied according to the usage time AG and the data power voltage AVDD of the data driver 500 varied according to the usage time AG based on the high power voltage setting value SELVDD, the low power voltage setting value SELVSS and the data power voltage setting value SAVDD.

The temperature adjuster 280 may multiply the first temperature prediction value TM1 by the ratio (e.g., the temperature efficiency EF) between the initial temperature for the input power at the initial time point and the present temperature for the input power at the present time point.

For example, the data driver 500 may generate the data voltages for the grayscale values based on the input image data IMG and the temperature prediction value TM2.

According to the display apparatus and the method of driving the display panel 100, the temperature prediction value TM2 may be determined using the temperature efficiency EF varied according to the usage time AG of the display panel 100 to enhance the accuracy of the temperature prediction value TM2.

In addition, the temperature prediction value TM2 may be determined using the high power voltage ELVDD, the low power voltage ELVSS and the data power voltage AVDD, which are varied according to the usage time AG of the display panel 100 so that the accuracy of the temperature prediction value TM2 may be enhanced.

The accuracy of the temperature prediction value TM2 may be enhanced so that the display quality of the display panel 100 may be enhanced and the reliability and the stability of the display apparatus may be effectively enhanced.

Figure 3:
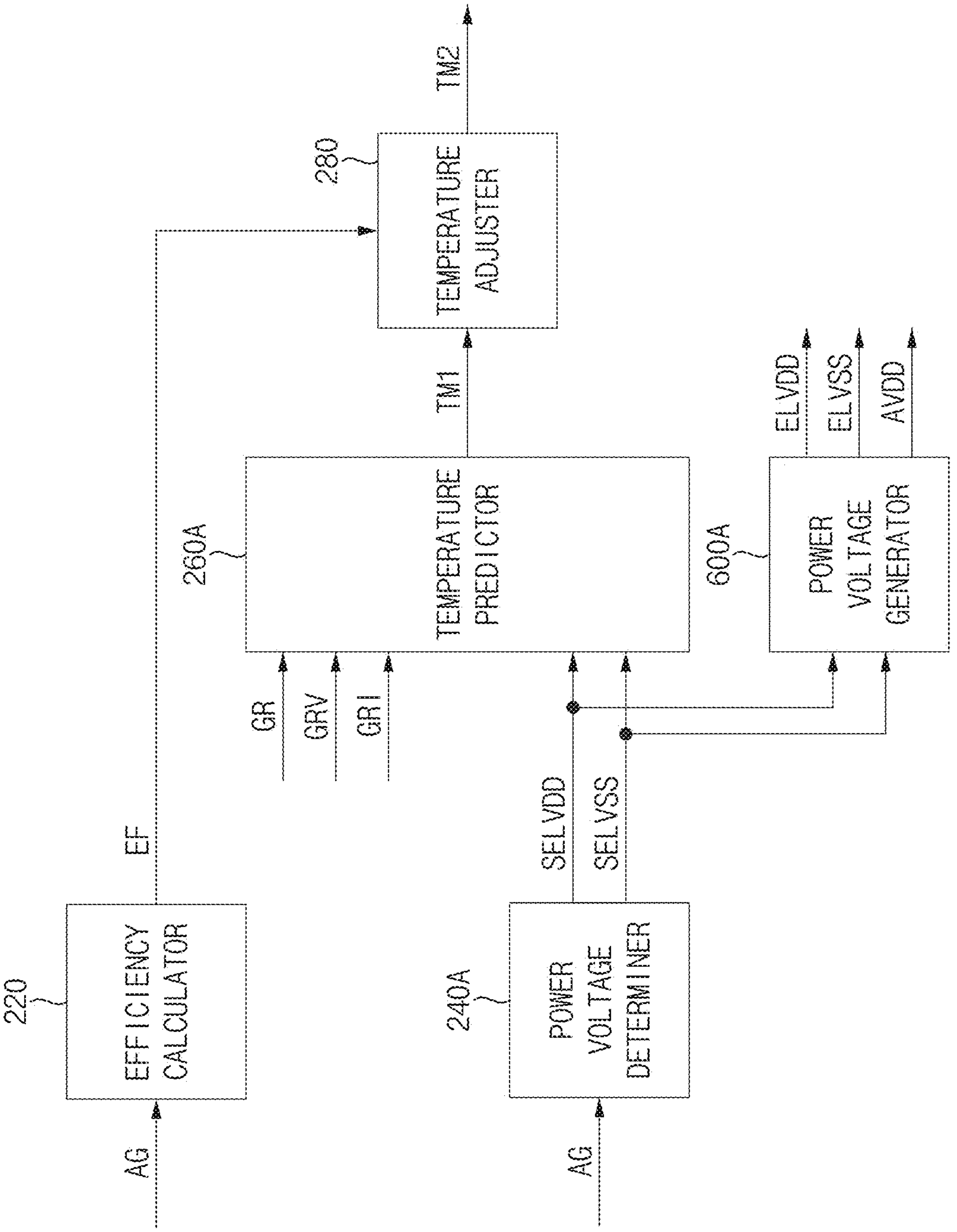
FIG. 3 is a block diagram illustrating a driving controller and a power voltage generator of a display apparatus according to another embodiment of the present invention.

FIG. 3 is a block diagram illustrating a driving controller and a power voltage generator of a display apparatus according to another embodiment of the present invention.

The display apparatus according to the present embodiment is substantially the same as the display apparatus of the previous embodiment explained referring to FIGS. 1 and 2 except that the temperature predictor 260A of the driving controller 200 and the power voltage generator 600A do not receive the data power voltage setting value. Thus, the same reference numerals will be used to refer to the same or like parts as those described in the previous embodiment of FIGS. 1 and 2 and any repetitive explanation concerning the above elements will be omitted.

Referring to FIGS. 1 and 3, the driving controller generates a temperature predication value TM2 according to a location in the display panel 100 based on a grayscale value GR of the input image data IMG, a grayscale data voltage GRV corresponding to the grayscale value GR, a grayscale data current GRI corresponding to the grayscale value GR, a temperature efficiency EF varied according to a usage time AG of the display panel 100, a high power voltage setting value SELVDD of the display panel 100 and a low power voltage setting value SELVSS of the display panel 100.

In the present embodiment, the driving controller may include an efficiency calculator 220 for calculating the temperature efficiency EF based on the usage time AG, a power voltage determiner 240A for determining the high power voltage setting value SELVDD and the low power voltage setting value SELVSS based on the usage time AG, a temperature predictor 260A for generating a first temperature prediction value TM1 based on the grayscale value GR, the grayscale data voltage GRV, the grayscale data current GRI, the high power voltage setting value SELVDD and the low power voltage setting value SELVSS and a temperature adjuster 280 for generating a second temperature prediction value TM2 by adjusting the first temperature prediction value TM1 using the temperature efficiency EF varied according to the usage time AG of the display panel 100.

The power voltage generator 600A may generate the high power voltage ELVDD of the display panel 100 varied according to the usage time AG and the low power voltage ELVSS of the display panel 100 varied according to the usage time AG based on the high power voltage setting value SELVDD and the low power voltage setting value SELVSS. The power voltage generator 600A may generate the data power voltage AVDD of the data driver 500 fixed regardless of the usage time AG.

According to the display apparatus and the method of driving the display panel 100, the temperature prediction value TM2 may be determined using the temperature efficiency EF varied according to the usage time AG of the display panel 100 to enhance the accuracy of the temperature prediction value TM2.

In addition, the temperature prediction value TM2 may be determined using the high power voltage ELVDD and the low power voltage ELVSS which are varied according to the usage time AG of the display panel 100 so that the accuracy of the temperature prediction value TM2 may be enhanced.

The accuracy of the temperature prediction value TM2 may be enhanced so that the display quality of the display panel 100 may be enhanced and the reliability and the stability of the display apparatus may be effectively enhanced.

Figure 4:
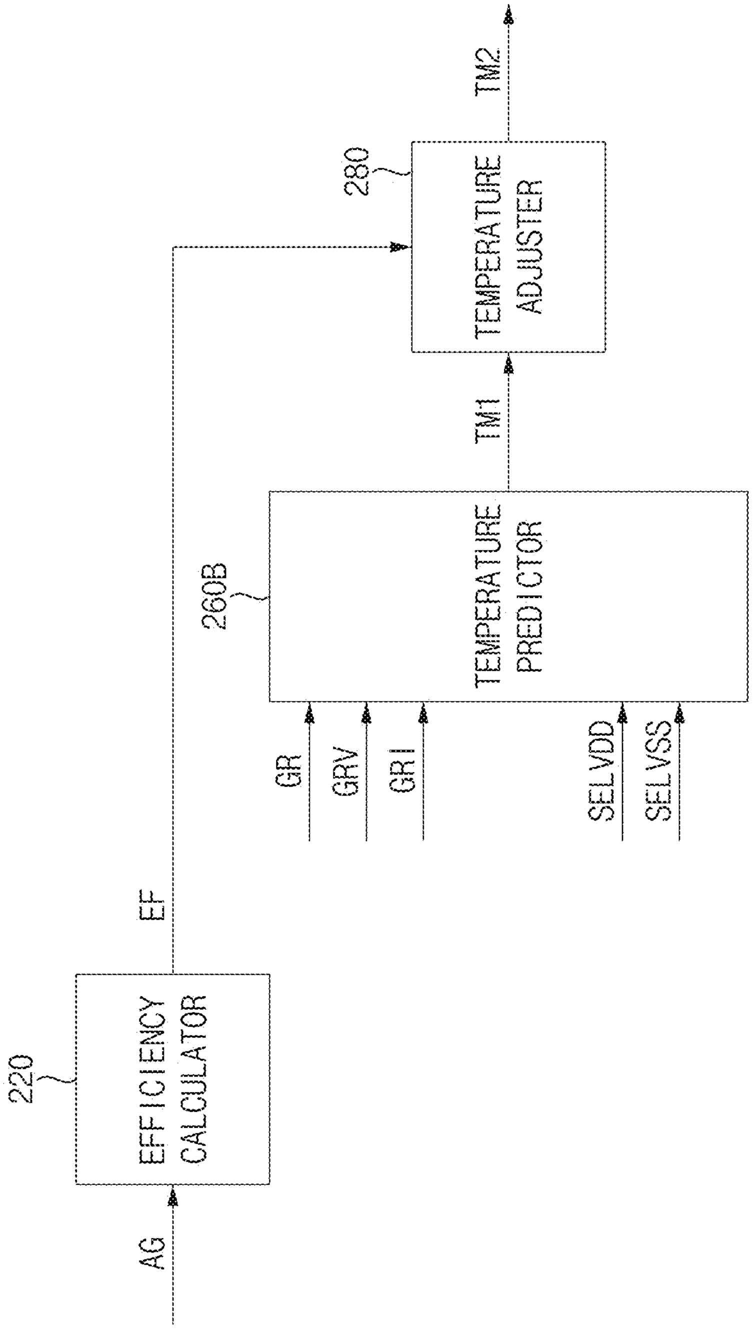
FIG. 4 is a block diagram illustrating a driving controller of a display apparatus according to still another embodiment of the present invention.

FIG. 4 is a block diagram illustrating a driving controller of a display apparatus according to still another embodiment of the present invention.

The display apparatus according to the present embodiment is substantially the same as the display apparatus of the previous embodiment explained referring to FIGS. 1 and 2 except that the temperature predictor 260B of the driving controller 200 receives a high power voltage setting value SELVDD and a low power voltage setting value SELVSS, which are fixed regardless of the usage time AG and does not receive the data power voltage setting value. Thus, the same reference numerals will be used to refer to the same or like parts as those described in the previous embodiment of FIGS. 1 and 2 and any repetitive explanation concerning the above elements will be omitted.

Referring to FIGS. 1 and 4, the driving controller generates a temperature predication value TM2 according to a location in the display panel 100 based on a grayscale value GR of the input image data IMG, a grayscale data voltage GRV corresponding to the grayscale value GR, a grayscale data current GRI corresponding to the grayscale value GR, a temperature efficiency EF varied according to a usage time AG of the display panel 100, a high power voltage setting value SELVDD of the display panel 100 and a low power voltage setting value SELVSS of the display panel 100.

In the present embodiment, the driving controller may include an efficiency calculator 220 for calculating the temperature efficiency EF based on the usage time AG, a temperature predictor 260B for generating a first temperature prediction value TM1 based on the grayscale value GR, the grayscale data voltage GRV, the grayscale data current GRI, the high power voltage setting value SELVDD and the low power voltage setting value SELVSS and a temperature adjuster 280 for generating a second temperature prediction value TM2 by adjusting the first temperature prediction value TM1 using the temperature efficiency EF varied according to the usage time AG of the display panel 100.

In the present embodiment, the temperature predictor 260B may receive the high power voltage setting value SELVDD and the low power voltage setting value SELVSS fixed regardless of the usage time AG.

According to the display apparatus and the method of driving the display panel 100, the temperature prediction value TM2 may be determined using the temperature efficiency EF varied according to the usage time AG of the display panel 100 to enhance the accuracy of the temperature prediction value TM2.

The accuracy of the temperature prediction value TM2 may be enhanced so that the display quality of the display panel 100 may be enhanced and the reliability and the stability of the display apparatus may be effectively enhanced.

Figure 5:
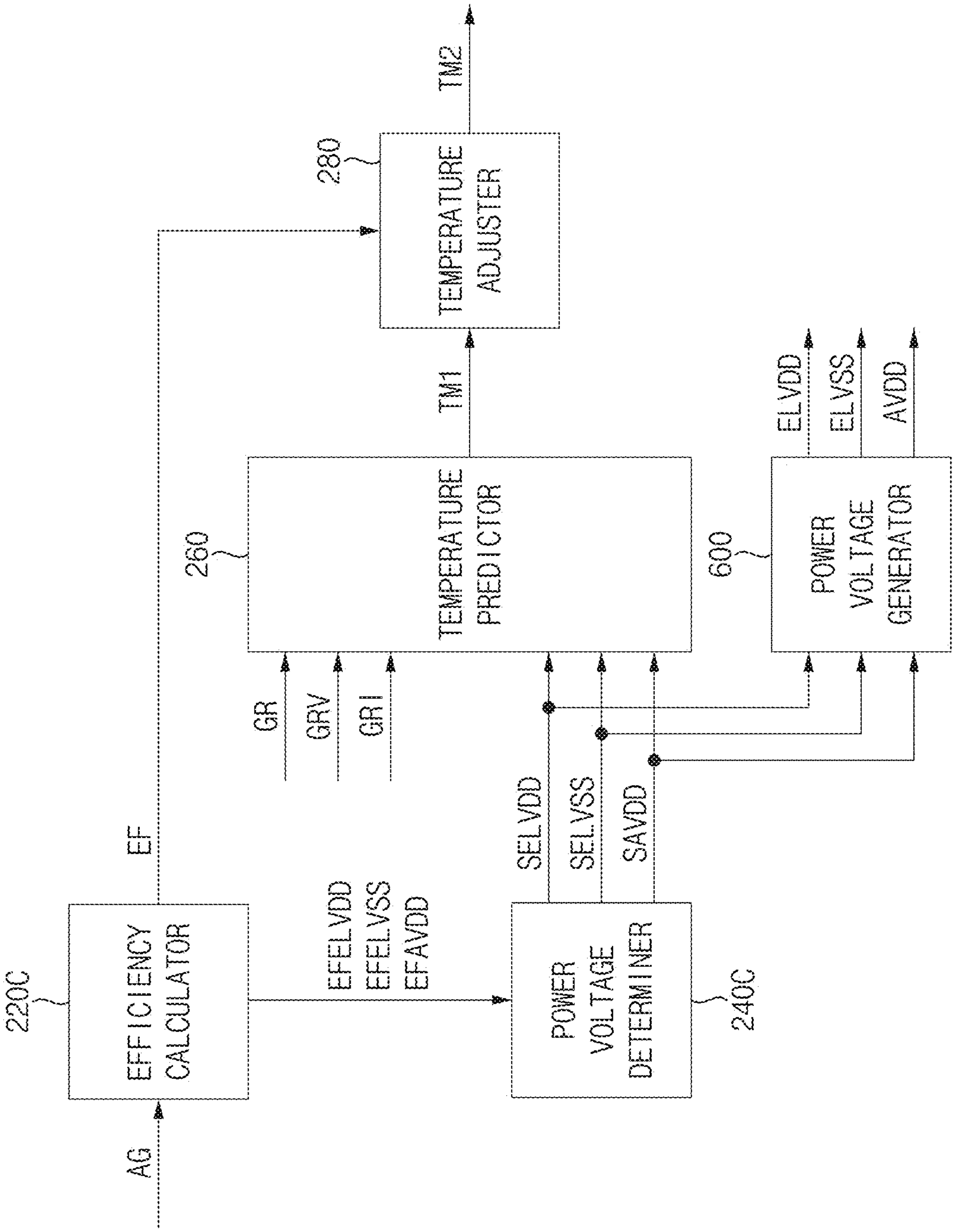
FIG. 5 is a block diagram illustrating a driving controller and a power voltage generator of a display apparatus according to yet another embodiment of the present invention.

FIG. 5 is a block diagram illustrating a driving controller and a power voltage generator of a display apparatus according to yet another embodiment of the present invention.

The display apparatus according to the present embodiment is substantially the same as the display apparatus of the previous embodiment explained referring to FIGS. 1 and 2 except that the power voltage determiner 240C of the driving controller 200 receives values of a high power voltage efficiency EFELVDD, a low power voltage efficiency EFELVSS and a data power voltage efficiency EFAVDD instead of receiving information of the usage time AG itself. Thus, the same reference numerals will be used to refer to the same or like parts as those described in the previous embodiment of FIGS. 1 and 2 and any repetitive explanation concerning the above elements will be omitted.

Referring to FIGS. 1 and 5, the driving controller generates a temperature predication value TM2 according to a location in the display panel 100 based on a grayscale value GR of the input image data IMG, a grayscale data voltage GRV corresponding to the grayscale value GR, a grayscale data current GRI corresponding to the grayscale value GR, a temperature efficiency EF varied according to a usage time AG of the display panel 100, a high power voltage setting value SELVDD of the display panel 100 and a low power voltage setting value SELVSS of the display panel 100.

The driving controller may include an efficiency calculator 220C for calculating the temperature efficiency EF based on the usage time AG, the high power voltage efficiency EFELVDD based on the usage time AG, the low power voltage efficiency EFELVSS based on the usage time AG and the data power voltage efficiency EFAVDD based on the usage time AG, a power voltage determiner 240C for determining the high power voltage setting value SELVDD based on the high power voltage efficiency EFELVDD, the low power voltage setting value SELVSS based on the low power voltage efficiency EFELVSS and the data power voltage setting value SAVDD of the data driver 500 based on the data power voltage efficiency EFAVDD, a temperature predictor 260 for generating a first temperature prediction value TM1 based on the grayscale value GR, the grayscale data voltage GRV, the grayscale data current GRI, the high power voltage setting value SELVDD, the low power voltage setting value SELVSS and the data power voltage setting value SAVDD and a temperature adjuster 280 for generating a second temperature prediction value TM2 by adjusting the first temperature prediction value TM1 using the temperature efficiency EF varied according to the usage time AG of the display panel 100.

The power voltage generator 600 may generate the high power voltage ELVDD of the display panel 100 varied according to the usage time AG, the low power voltage ELVSS of the display panel 100 varied according to the usage time AG and the data power voltage AVDD of the data driver 500 varied according to the usage time AG based on the high power voltage setting value SELVDD, the low power voltage setting value SELVSS and the data power voltage setting value SAVDD.

According to the display apparatus and the method of driving the display panel 100, the temperature prediction value TM2 may be determined using the temperature efficiency EF varied according to the usage time AG of the display panel 100 to enhance the accuracy of the temperature prediction value TM2.

In addition, the temperature prediction value TM2 may be determined using the high power voltage ELVDD, the low power voltage ELVSS and the data power voltage AVDD which are varied according to the usage time AG of the display panel 100 so that the accuracy of the temperature prediction value TM2 may be enhanced.

The accuracy of the temperature prediction value TM2 may be enhanced so that the display quality of the display panel 100 may be enhanced and the reliability and the stability of the display apparatus may be effectively enhanced.

Figure 6:
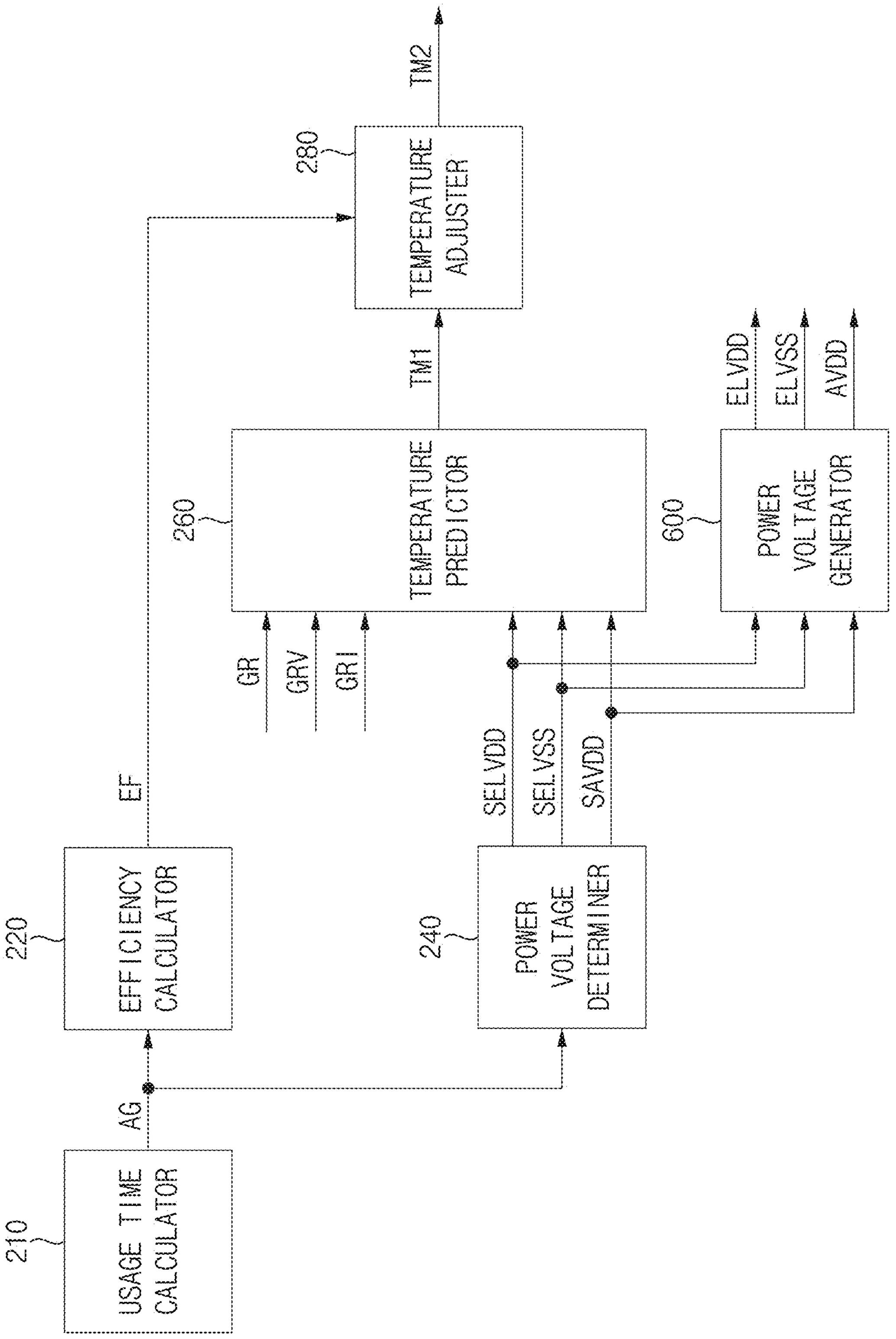
FIG. 6 is a block diagram illustrating a driving controller and a power voltage generator of a display apparatus according to another embodiment of the present invention.

FIG. 6 is a block diagram illustrating a driving controller and a power voltage generator of a display apparatus according to another embodiment of the present invention.

The display apparatus according to the present embodiment is substantially the same as the display apparatus of the previous embodiment explained referring to FIGS. 1 and 2 except that the driving controller 200 further includes a usage time AG calculator 210. Thus, the same reference numerals will be used to refer to the same or like parts as those described in the previous embodiment of FIGS. 1 and 2 and any repetitive explanation concerning the above elements will be omitted.

Referring to FIGS. 1 to 6, the driving controller 200 generates a temperature predication value TM2 according to a location in the display panel 100 based on a grayscale value GR of the input image data IMG, a grayscale data voltage GRV corresponding to the grayscale value GR, a grayscale data current GRI corresponding to the grayscale value GR, a temperature efficiency EF varied according to a usage time AG of the display panel 100, a high power voltage setting value SELVDD of the display panel 100 and a low power voltage setting value SELVSS of the display panel 100.

The driving controller 200 may include the usage time calculator 210 for calculating the usage time AG of the display panel 100, an efficiency calculator 220 for calculating the temperature efficiency EF based on the usage time AG, a power voltage determiner 240 for determining the high power voltage setting value SELVDD, the low power voltage setting value SELVSS and a data power voltage setting value SAVDD based on the usage time AG, a temperature predictor 260 for generating a first temperature prediction value TM1 based on the grayscale value GR, the grayscale data voltage GRV, the grayscale data current GRI, the high power voltage setting value SELVDD, the low power voltage setting value SELVSS and the data power voltage setting value SAVDD and a temperature adjuster 280 for generating a second temperature prediction value TM2 by adjusting the first temperature prediction value TM1 using the temperature efficiency EF varied according to the usage time AG of the display panel 100.

The usage time calculator 210 may calculate the usage time AG by accumulating a turn-on time of the display panel 100. The usage time calculator 210 may calculate the usage time AG based on the turn-on time of the display panel 100 and a display luminance of the display panel 100. For example, when the display luminance is high, the usage time AG may be accumulated in a high weight. For example, when the display luminance is low, the usage time AG may be accumulated in a low weight. Alternatively, the usage time calculator 210 may calculate the usage time AG in a unit of a pixel of the display panel 100.

The power voltage generator 600 may generate the high power voltage ELVDD of the display panel 100 varied according to the usage time AG, the low power voltage ELVSS of the display panel 100 varied according to the usage time AG and the data power voltage AVDD of the data driver 500 varied according to the usage time AG based on the high power voltage setting value SELVDD, the low power voltage setting value SELVSS and the data power voltage setting value SAVDD.

According to the display apparatus and the method of driving the display panel 100, the temperature prediction value TM2 may be determined using the temperature efficiency EF varied according to the usage time AG of the display panel 100 to enhance the accuracy of the temperature prediction value TM2.

In addition, the temperature prediction value TM2 may be determined using the high power voltage ELVDD, the low power voltage ELVSS and the data power voltage AVDD which are varied according to the usage time AG of the display panel 100 so that the accuracy of the temperature prediction value TM2 may be enhanced.

The accuracy of the temperature prediction value TM2 may be enhanced so that the display quality of the display panel 100 may be enhanced and the reliability and the stability of the display apparatus may be effectively enhanced.

FIG. 7 is a block diagram illustrating a driving controller and a power voltage generator of a display apparatus according to still another embodiment of the present invention.

The display apparatus according to the present embodiment is substantially the same as the display apparatus of the previous embodiment explained referring to FIGS. 1 and 2 except that the temperature predictor and the temperature adjuster of the driving controller are integrally formed. Thus, the same reference numerals will be used to refer to the same or like parts as those described in the previous embodiment of FIGS. 1 and 2 and any repetitive explanation concerning the above elements will be omitted.

Referring to FIGS. 1 and 7, the driving controller 200 generates a temperature predication value TM according to a location in the display panel 100 based on a grayscale value GR of the input image data IMG, a grayscale data voltage GRV corresponding to the grayscale value GR, a grayscale data current GRI corresponding to the grayscale value GR, a temperature efficiency EF varied according to a usage time AG of the display panel 100, a high power voltage setting value SELVDD of the display panel 100 and a low power voltage setting value SELVSS of the display panel 100.

In the present embodiment, the driving controller 200 may include an efficiency calculator 220 for calculating the temperature efficiency EF based on the usage time AG, a power voltage determiner 240 for determining the high power voltage setting value SELVDD, the low power voltage setting value SELVSS and a data power voltage setting value SAVDD based on the usage time AG and a temperature predictor 260D for generating a temperature prediction value TM based on the grayscale value GR, the grayscale data voltage GRV, the grayscale data current GRI, the temperature efficiency EF which is varied according to the usage time AG of the display panel 100, the high power voltage setting value SELVDD, the low power voltage setting value SELVSS and the data power voltage setting value SAVDD.

The power voltage generator 600 may generate the high power voltage ELVDD of the display panel 100 varied according to the usage time AG, the low power voltage ELVSS of the display panel 100 varied according to the usage time AG and the data power voltage AVDD of the data driver 500 varied according to the usage time AG based on the high power voltage setting value SELVDD, the low power voltage setting value SELVSS and the data power voltage setting value SAVDD.

According to the display apparatus and the method of driving the display panel 100, the temperature prediction value TM2 may be determined using the temperature efficiency EF varied according to the usage time AG of the display panel 100 to enhance the accuracy of the temperature prediction value TM2.

In addition, the temperature prediction value TM2 may be determined using the high power voltage ELVDD, the low power voltage ELVSS and the data power voltage AVDD which are varied according to the usage time AG of the display panel 100 so that the accuracy of the temperature prediction value TM2 may be enhanced.

The accuracy of the temperature prediction value TM2 may be enhanced so that the display quality of the display panel 100 may be enhanced and the reliability and the stability of the display apparatus may be effectively enhanced.

Figure 8:
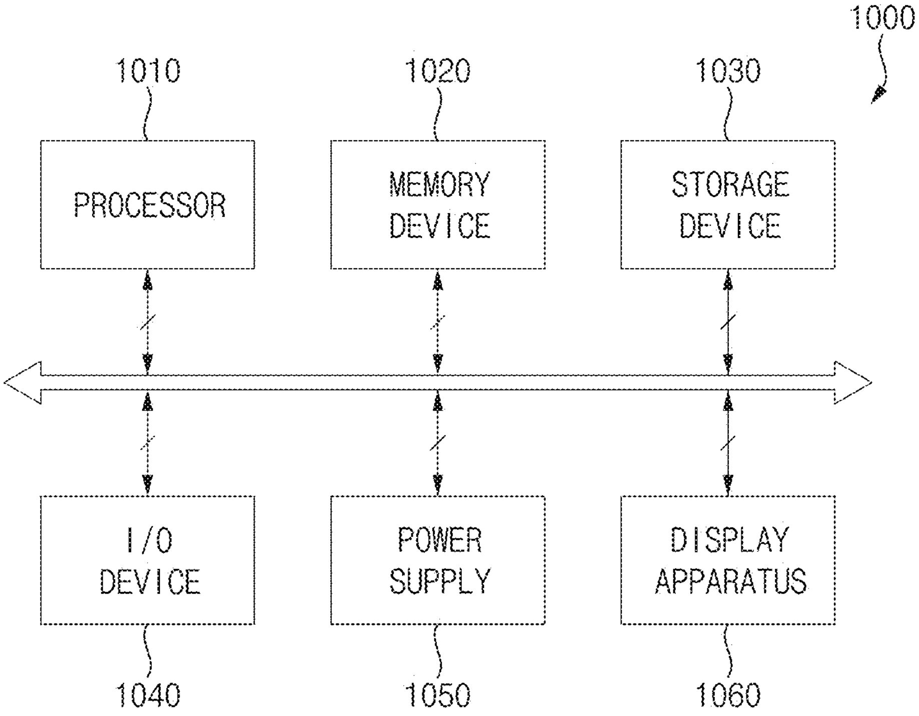
FIG. 8 is a block diagram illustrating an electronic apparatus according to an embodiment of the present invention.
Figure 9:
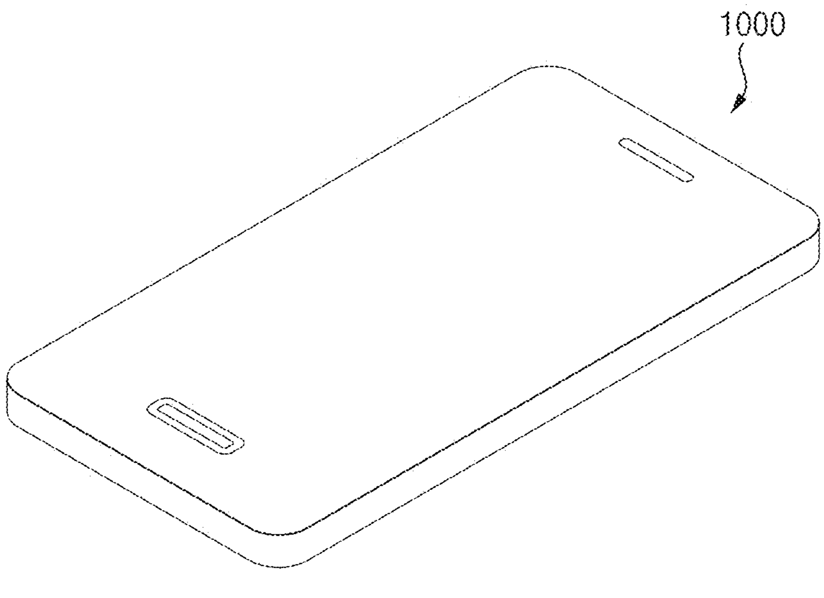
FIG. 9 is a diagram illustrating an example in which the electronic apparatus of FIG. 8 is implemented as a smartphone.
Figure 10:
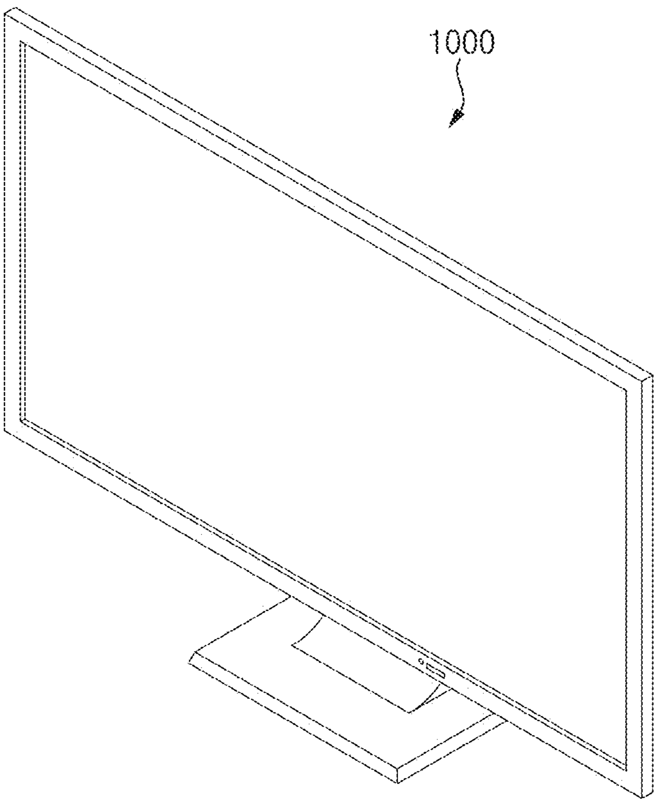
FIG. 10 is a diagram illustrating an example in which the electronic apparatus of FIG. 8 is implemented as a monitor.

FIG. 8 is a block diagram illustrating an electronic apparatus according to an embodiment of the present invention. FIG. 9 is a diagram illustrating an example in which the electronic apparatus of FIG. 8 is implemented as a smartphone. FIG. 10 is a diagram illustrating an example in which the electronic apparatus of FIG. 8 is implemented as a monitor.

Referring to FIGS. 8 to 10, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 9, the electronic apparatus 1000 may be implemented as a smartphone. In an embodiment, as illustrated in FIG. 10, the electronic apparatus 1000 may be implemented as a monitor. However, the electronic apparatus 1000 is not limited thereto. For another example, the electronic apparatus 1000 may be implemented as a television, a cellular phone, a video phone, a smart pad, a smart watch, a tablet PC, a car navigation system, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 11:
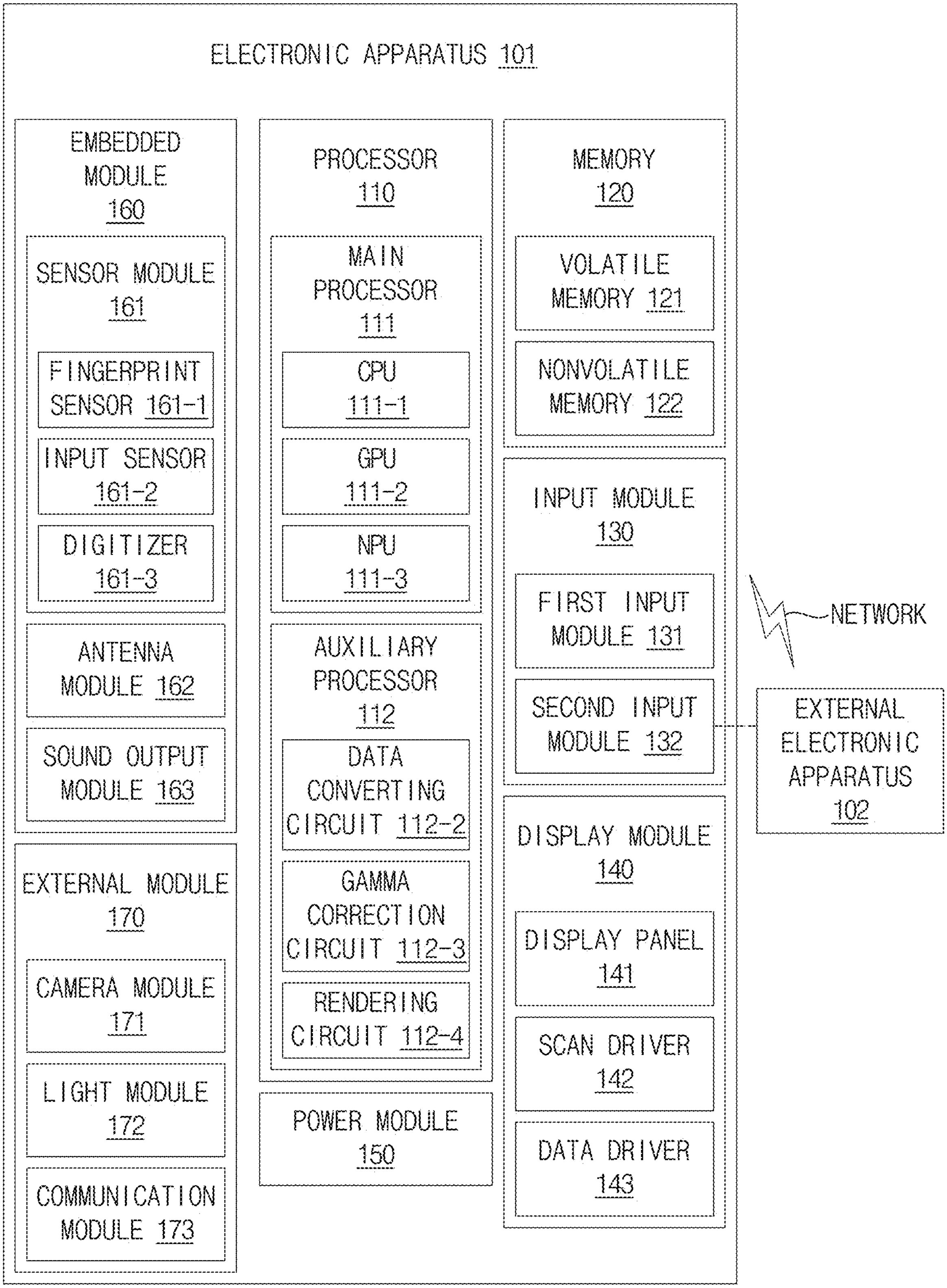
FIG. 11 is a block diagram illustrating an electronic apparatus according to an embodiment of the present invention.

FIG. 11 is a block diagram illustrating an electronic apparatus 101 according to an embodiment of the present invention.

Referring to FIGS. 1 to 11, an electronic apparatus 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. For example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains input fingerprint information as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input in the music streaming application, the processor 110 activates a sound output module 163 to provide sound information corresponding to the music execution command to the user.

In the above, the operation of the electronic apparatus 101 is briefly described. Hereinafter, a configuration of the electronic apparatus 101 is described in detail. Some of elements of the electronic apparatus 101 described later may be integrated and provided as one element, or one element may be separated as two or more elements.

The electronic apparatus 101 may communicate with an external electronic apparatus 102 through a network (e.g., a short-range wireless communication network or a long-range wireless communication network). According to an embodiment, the electronic apparatus 101 may include the processor 110, the memory 120, the input module 130, the display module 140, a power module 150, an embedded module 160, and an external module 170. According to an embodiment, in the electronic apparatus 101, at least one of the above-described elements may be omitted or one or more other apparatus may be added. According to an embodiment, some of the above-described elements (e.g., the sensor module 161, an antenna module 162 or the sound output module 163) may be integrated into another element (e.g., the display module 140).

The processor 110 may execute software to control at least one other element (e.g., hardware or software element) of the electronic apparatus 101 connected to the processor 110 and to perform various data processing or operations. According to an embodiment, as at least part of the data processing or the operations, the processor 110 may store instructions or data received from other elements (e.g., the input module 130, the sensor module 161 or a communication module 173) in a volatile memory 121, may process the instructions or data stored in the volatile memory 121 and may store result data of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include any one or more of a graphic processing unit (GPU) 111-2, a communication processor (CP) and an image signal processor (ISP). The main processor 111 may further include a neural processing unit (NPU) 111-3. The neural network processing unit 111-3 is a processor specialized in processing an artificial intelligence model. The artificial intelligence model may be generated through a machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN) and a deep Q-networks or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g., a single chip) or each may be implemented as independent elements (e.g., in a plurality of chips).

The auxiliary processor 112 may include a controller. The controller may include an interface conversion circuit and a timing control circuit. The controller receives an image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance according to characteristics of the electronic apparatus 101 or a user setting or may convert the image data to reduce a power consumption or compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one of the data converting circuit 112-2, the gamma correction circuit 112-3 and the rendering circuit 112-4 may be integrated into another element (e.g., the main processor 111 or the controller). At least one of the data converting circuit 112-2, the gamma correction circuit 112-3 and the rendering circuit 112-4 may be integrated into a data driver 143 to be described later.

The memory 120 may store various data used by at least one element (e.g., the processor 110 or the sensor module 161) of the electronic apparatus 101 and input data or output data for commands related thereto. The memory 120 may include at least one of the volatile memory 121 and the nonvolatile memory 122.

The input module 130 may receive commands or data used to the elements (e.g., the processor 110, the sensor module 161 or the sound output module 163) of the electronic apparatus 101 from the outside of the electronic apparatus 101 (e.g., the user or the external electronic apparatus 102).

The input module 130 may include a first input module 131 for receiving commands or data from the user and a second input module 132 for receiving commands or data from the external electronic apparatus 102. The first input module 131 may include a microphone, a mouse, a keyboard, a key (e.g., a button) or a pen (e.g., a passive pen or an active pen). The second input module 132 may support a designated protocol capable of connecting to the external electronic apparatus 102 by wire or wirelessly. According to an embodiment, the second input module 132 may include a high definition multimedia interface (HDMI), a universal serial bus (USB) interface, an SD card interface or an audio interface. The second input module 132 may include a connector physically connected to the external electronic apparatus 102, for example, an HDMI connector, a USB connector, an SD card connector, or an audio connector (e.g., a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. A type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. Alternatively, the scan driver 142 may be integrated on the display panel 141. For example, the scan driver 142 may include an amorphous silicon TFT gate driver circuit (ASG) integrated on the display panel 141, a low temperature polycrystaline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. The light emission driver may be formed independently from the scan driver 142. Alternatively, the light emission driver and the scan driver 142 may be integrally formed.

The data driver 143 receives a control signal from the controller and converts the image data into an analog voltage (e.g., the data voltage) and output the data voltages to the display panel 141 in response to the control signal.

The data driver 143 may be integrated into another element (e.g., the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic apparatus 101. The power module 150 may include a battery which supplies a power voltage. The battery may include a non-rechargeable primary cell, a rechargeable secondary cell or a fuel cell. The power module 150 may include a power management integrated circuit (PMIC). The PMIC supplies optimized power to each of the above-described modules and modules described later.

The power module 150 may include a wireless power transmission/reception member electrically connected to the battery. The wireless power transmission/reception member may include a plurality of antenna radiators in a form of coils.

The electronic apparatus 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corresponding to the input. The sensor module 161 may include at least one of the fingerprint sensor 161-1, the input sensor 161-2 and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure bio signals such as a blood pressure, a moisture, or a body fat. For example, when a user touches a part of his body to a sensor layer or a sensing panel and does not move for a certain period of time, the input sensor 161-2 may detect the bio signal based on a change in an electric field caused by the part of the body so that the display module 140 may output user's desired information.

The digitizer 161-3 may generate a data value corresponding to the coordinate information input by the pen. The digitizer 161-3 generates an amount of electromagnetic change by the input as a data value. The digitizer 161-3 may detect an input by the passive pen or transmit/receive data to/from the active pen.

At least one of the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one of the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The present invention may not be limited to a position of the sensing panel.

At least one of the fingerprint sensor 161-1, the input sensor 161-2 and the digitizer 161-3 may be embedded in the display panel 141. For example, at least one of the fingerprint sensor 161-1, the input sensor 161-2 and the digitizer 161-3 is formed simultaneously with the display panel 141 through a process of forming elements included in the display panel 141 (e.g., light emitting elements, transistors, etc.).

In addition, the sensor module 161 may generate an electrical signal or a data value corresponding to an internal state or an external state of the electronic apparatus 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor or an illuminance sensor.

The antenna module 162 may include one or more antennas for transmitting a signal or power to outside or receiving a signal or power from outside. According to an embodiment, the communication module 173 may transmit a signal to an external electronic apparatus or receive a signal from an external electronic apparatus through an antenna suitable for a communication method. An antenna pattern of the antenna module 162 may be integrated with an element of the display module 140 (e.g., the display panel 141) or the input sensor 161-2.

The sound output module 163 is a device for outputting sound signals to the outside of the electronic apparatus 101. For example, the sound output module 163 may include a speaker used for general purposes such as playing multimedia or recording and a receiver used exclusively for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of for determining a presence or an absence of a user, the user's location and the user's gaze.

The light module 172 may provide a light. The light module 172 may include a light emitting diode or a xenon lamp. The light module 172 may operate in conjunction with the camera module 171 or operate independently.

The communication module 173 may support establishment of a wired or wireless communication channel between the electronic apparatus 101 and the external electronic apparatus 102 and communication through the established communication channel. The communication module 173 may include one or both of a wireless communication module such as a cellular communication module, a short-distance wireless communication module, or a global navigation satellite system (GNSS) communication module and a wired communication module such as a local area network (LAN) communication module, or a power line communication module. The communication module 173 may communicate with the external electronic apparatus 102 through a short-range communication network such as Bluetooth, WiFi direct or infrared data association (IrDA) or a long-distance communication network such as a cellular network, the Internet, or a computer network (e.g., LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. For example, the processor 110 may generate image data corresponding to input data applied through a mouse or an active pen, and output the generated image data to the display module 140 or the processor 110 may generate command data corresponding to the input data and output the generated command data to the camera module 171 or the light module 172. When input data is not received from the input module 130 for a certain period of time, the processor 110 converts an operation mode of the electronic apparatus 101 into a low power mode or a sleep mode so that a power consumption of the electronic apparatus 101 may be reduced.

The processor 110 outputs commands or data to the display module 140, the sound output module 163, the camera module 171 or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the sensed data sensed by the input sensor 161-2 or the digitizer 161-3. When the sensor module 161 includes a temperature sensor, the processor 110 may receive temperature data for the temperature measured from the sensor module 161 and may further perform luminance correction on the image data based on the temperature data.

The processor 110 may receive determined data about the presence or the absence of the user, the user's location and the user's gaze from the camera module 171. The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output (GPIO), a serial peripheral interface (SPI), a mobile industry processor interface (MIPI), or an ultra path interconnect (UPI) link to exchange signals (e.g., commands or data) with each other. The processor 110 may communicate with the display module 140 through an agreed interface. For example, the processor 110 may communicate with the display module 140 through any one of the above communication methods. The present invention may not be limited to the above communication methods.

The electronic apparatus 101 according to various embodiments disclosed in the disclosure may be various types of apparatuses. For example, the electronic apparatus 101 may include at least one of a monitor, a portable communication apparatus (e.g., a smart phone), a computer apparatus, a portable multimedia apparatus, a portable medical apparatus, a camera, a wearable device and a home appliance. The electronic apparatus 101 according to the embodiment of the disclosure may not be limited to the aforementioned apparatuses.

For example, the display panel 100 of FIG. 1 may correspond to the display panel 141 of FIG. 11. For example, the driving controller 200 of FIG. 1 may correspond to the controller of the auxiliary processor 112 of FIG. 11. For example, the gate driver 300 of FIG. 1 may correspond to the scan driver 142 of FIG. 11. For example, the data driver 500 of FIG. 1 may correspond to the data driver 143 of FIG. 11.

Like the processor 110, the controller of the auxiliary processor 112, which corresponds to the driving controller 200, may store instructions or data received from other elements or a volatile memory 121, may process the instructions or data stored in the volatile memory 121 and may store result data of the processing in a nonvolatile memory 122. For example, the display apparatus may include a memory storing instructions that, when executed by the driving controller 200, cause the driving controller 200 to generate a temperature prediction value according to a location in the display panel based on a grayscale value of input image data, a grayscale data voltage corresponding to the grayscale value, a grayscale data current corresponding to the grayscale value, a temperature efficiency which is varied according to a usage time of the display panel, a high power voltage setting value of the display panel and a low power voltage setting value of the display panel. The data driver 500 and the power voltage generator 600 may also be operated by instructions stored in the memory 120 like the driving controller 200.

According to the embodiments of the display apparatus and the method of driving the display panel using the display apparatus, the accuracy of the temperature prediction value may be enhanced.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A display apparatus comprising:

a display panel;

a data driver configured to output a data voltage to the display panel; and a driving controller configured to control the data driver, wherein the driving controller is configured to generate a temperature prediction value according to a location in the display panel based on a grayscale value of input image data, a grayscale data voltage corresponding to the grayscale value, a grayscale data current corresponding to the grayscale value, a temperature efficiency which is varied according to a usage time of the display panel, a high power voltage setting value of the display panel and a low power voltage setting value of the display panel, wherein the driving controller comprises:

an efficiency calculator configured to calculate the temperature efficiency based on the usage time, a high power voltage efficiency based on the usage time, a low power voltage efficiency based on the usage time, and a data power voltage efficiency based on the usage time, a power voltage determiner configured to determine the high power voltage setting value based on the high power voltage efficiency, the low power voltage setting value based on the low power voltage efficiency, and a data power voltage setting value of the data driver based on the data power voltage efficiency, a temperature predictor configured to generate an initial temperature prediction value based on the grayscale value, the grayscale data voltage, the grayscale data current, the high power voltage setting value and the low power voltage setting value and configured to output the initial temperature prediction value to a temperature adjuster; and the temperature adjuster configured to generate the temperature prediction value by adjusting the initial temperature prediction value received from the temperature predictor using the temperature efficiency which is varied according to the usage time of the display panel.

2. The display apparatus of claim 1, wherein the grayscale data voltage is varied according to a luminance setting value set by a user.

3. The display apparatus of claim 1, wherein the grayscale data voltage is varied according to a driving frequency of the display panel.

4. The display apparatus of claim 1, wherein the grayscale data voltage is varied according to a color of a pixel of the display panel.

5. The display apparatus of claim 4, wherein the grayscale data current is varied according to the grayscale data voltage and the color of the pixel of the display panel.

6. The display apparatus of claim 1, wherein the temperature efficiency is represented as a ratio of a present temperature change for an input power at a present time point to an initial temperature change for the input power at an initial time point.

7. The display apparatus of claim 1, wherein the high power voltage setting value and the low power voltage setting value are varied according to the usage time of the display panel.

8. The display apparatus of claim 1, wherein the temperature efficiency is represented as a ratio of a present temperature change for an input power at a present time point to an initial temperature change for the input power at an initial time point, and wherein the temperature adjuster is configured to multiply the initial temperature prediction value by the ratio.

9. The display apparatus of claim 1, wherein the driving controller is configured to generate the temperature prediction value based on the grayscale value, the grayscale data voltage, the grayscale data current, the temperature efficiency which is varied according to the usage time of the display panel, the high power voltage setting value, the low power voltage setting value and the data power voltage setting value of the data driver, and wherein the high power voltage setting value, the low power voltage setting value and the data power voltage setting value are varied according to the usage time of the display panel.

10. The display apparatus of claim 9, wherein the temperature predictor is configured to generate the initial temperature prediction value further based on the data power voltage setting value, and wherein the display apparatus further comprises a power voltage generator configured to generate a high power voltage of the display panel, a low power voltage of the display panel and a data power voltage of the data driver which are varied according to the usage time based on the high power voltage setting value, the low power voltage setting value and the data power voltage setting value.

11. The display apparatus of claim 1, wherein the display apparatus further comprises a power voltage generator configured to generate a high power voltage of the display panel and a low power voltage of the display panel which are varied according to the usage time based on the high power voltage setting value and the low power voltage setting value, and wherein the power voltage generator is configured to generate a data power voltage of the data driver fixed regardless of the usage time.

12. The display apparatus of claim 1, wherein the temperature predictor is configured to generate the initial temperature prediction value further based on the data power voltage setting value, and wherein the display apparatus further comprises a power voltage generator configured to generate a high power voltage of the display panel varied according to the usage time, a low power voltage of the display panel varied according to the usage time and a data power voltage of the data driver varied according to the usage time based on the high power voltage setting value, the low power voltage setting value and the data power voltage setting value.

13. The display apparatus of claim 1, wherein the temperature predictor is configured to generate the initial temperature prediction value further based on the data power voltage setting value, and wherein the display apparatus further comprises a power voltage generator configured to generate a high power voltage of the display panel varied according to the usage time, a low power voltage of the display panel varied according to the usage time and a data power voltage of the data driver varied according to the usage time based on the high power voltage setting value, the low power voltage setting value and the data power voltage setting value.

14. A method of driving a display panel, the method comprising:

generating a temperature prediction value according to a location in the display panel based on a grayscale value of input image data, a grayscale data voltage corresponding to the grayscale value, a grayscale data current corresponding to the grayscale value, a temperature efficiency which is varied according to a usage time of the display panel, a high power voltage setting value of the display panel and a low power voltage setting value of the display panel;

generating a data voltage for the grayscale value based on the input image data and the temperature prediction value; and displaying an image on the display panel based on the data voltage for the grayscale value, wherein the generating of the temperature prediction value comprises:

calculating, by an efficiency calculator, the temperature efficiency based on the usage time, a high power voltage efficiency based on the usage time, a low power voltage efficiency based on the usage time, and a data power voltage efficiency based on the usage time;

determining, by a power voltage determiner, the high power voltage setting value based on the high power voltage efficiency, the low power voltage setting value based on the low power voltage efficiency, and a data power voltage setting value of a data driver based on the data power voltage efficiency;

generating, by a temperature predictor, an initial temperature prediction value based on the grayscale value, the grayscale data voltage, the grayscale data current, the high power voltage setting value and the low power voltage setting value; and generating, by a temperature adjuster, the temperature prediction value by adjusting the initial temperature prediction value received from the temperature predictor using the temperature efficiency which is varied according to the usage time of the display panel, wherein the temperature predictor is configured to output the initial temperature prediction value to the temperature adjuster.

15. The method of claim 14, wherein the grayscale data voltage is varied according to at least one of a luminance setting value set by a user, a driving frequency of the display panel and a color of a pixel of the display panel, and wherein the grayscale data current is varied according to the grayscale data voltage and the color of the pixel of the display panel.

16. The method of claim 14, wherein the generating of the temperature prediction value comprises generating the temperature prediction value based on the grayscale value, the grayscale data voltage, the grayscale data current, the temperature efficiency which is varied according to the usage time of the display panel, the high power voltage setting value, the low power voltage setting value and the data power voltage setting value of a data driver, and wherein the high power voltage setting value, the low power voltage setting value and the data power voltage setting value are varied according to the usage time of the display panel.

17. An electronic apparatus comprising:

a display panel;

a data driver configured to output a data voltage to the display panel;

a driving controller configured to control the data driver; and a processor configured to output input image data and an input control signal to the driving controller, wherein the driving controller is configured to generate a temperature prediction value according to a location in the display panel based on a grayscale value of input image data, a grayscale data voltage corresponding to the grayscale value, a grayscale data current corresponding to the grayscale value, a temperature efficiency which is varied according to a usage time of the display panel, a high power voltage setting value of the display panel and a low power voltage setting value of the display panel, wherein the driving controller comprises:

an efficiency calculator configured to calculate the temperature efficiency based on the usage time, a high power voltage efficiency based on the usage time, a low power voltage efficiency based on the usage time, and a data power voltage efficiency based on the usage time;

a power voltage determiner configured to determine the high power voltage setting value based on the high power voltage efficiency, the low power voltage setting value based on the low power voltage efficiency, and a data power voltage setting value of the data driver based on the data power voltage efficiency;

a temperature predictor configured to generate an initial temperature prediction value based on the grayscale value, the grayscale data voltage, the grayscale data current, the high power voltage setting value and the low power voltage setting value and configured to output the initial temperature prediction value to a temperature adjuster; and the temperature adjuster configured to generate the temperature prediction value by adjusting the initial temperature prediction value received from the temperature predictor using the temperature efficiency which is varied according to the usage time of the display panel.

* * * * *